E. A. KOTTKE.
DETACHABLE AUTO PULLEY.
APPLICATION FILED MAR. 29, 1917.

1,262,959.

Patented Apr. 16, 1918.

WITNESSES
Chas. E. Kemper
L. B. Middleton

INVENTOR
Edward A. Kottke.
BY Richard B. Owen,
ATTORNEY

UNITED STATES PATENT OFFICE.

EDWARD A. KOTTKE, OF HUTCHINSON, MINNESOTA.

DETACHABLE AUTO-PULLEY.

1,262,959.　　　　　　Specification of Letters Patent.　　Patented Apr. 16, 1918.

Application filed March 29, 1917.　Serial No. 158,349.

*To all whom it may concern:*

Be it known that I, EDWARD A. KOTTKE, a citizen of the United States, residing at Hutchinson, in the county of McLeod and State of Minnesota, have invented certain new and useful Improvements in Detachable Auto-Pulleys, of which the following is a specification.

This invention relates to an attachment for automobiles, and the principal object of the invention is to provide means for attaching a belt pulley to one of the drive wheels of the automobile, whereby the automobile may be made to act as a stationary engine.

Another object of the invention is to provide means whereby the pulley may be attached and detached, with a minimum amount of effort and in the least possible time.

Another object of the invention is to provide a rim to which the pulley is to be connected and simple and efficient means for securing said rim to the spokes of the wheel.

The invention also consists in certain other features of construction and in the combination and arrangement of the several parts, to be hereinafter fully described and specifically pointed out in the appended claim.

In describing my invention in detail, reference will be had to the accompanying drawings, wherein like characters denote like or corresponding parts throughout the several views, and in which.

Figure 1:
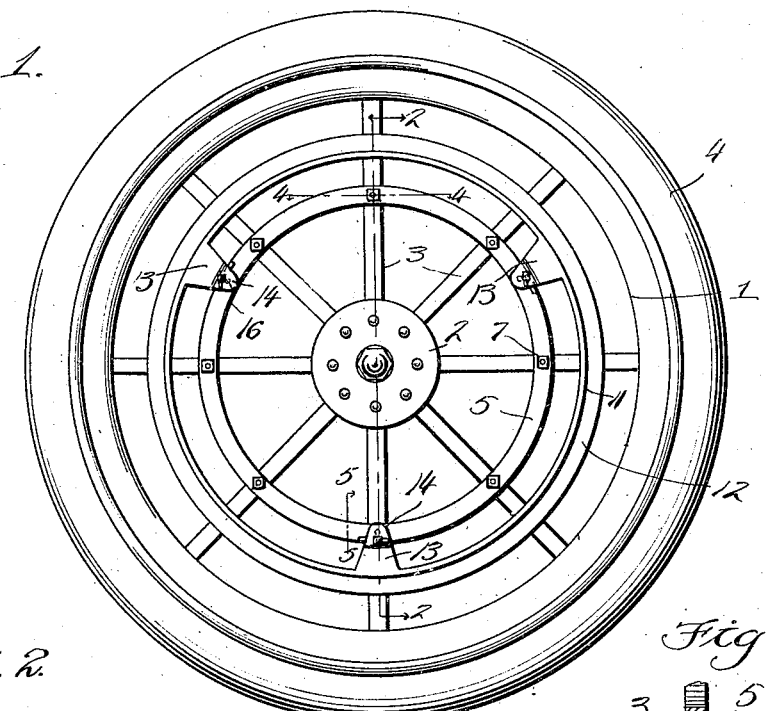
Figure 1 shows an automobile wheel, with the invention applied thereto.
Figure 2:
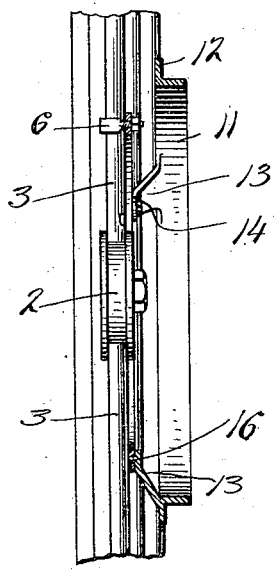
Fig. 2 is a section on line 2—2 of Fig. 1.
Figure 3:
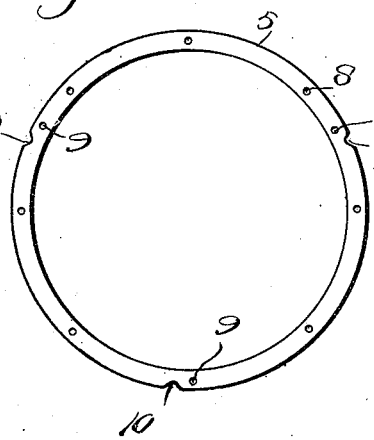
Fig. 3 is a front view of the rim alone.
Figure 4:
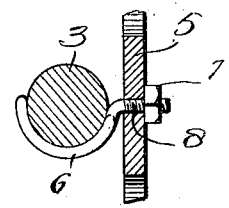
Fig. 4 is a section on line 4—4 of Fig. 1.
Figure 5:
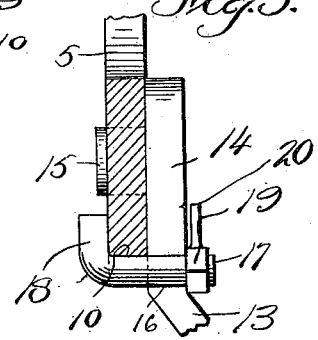
Fig. 5 is a section on line 5—5 of Fig. 1.

In these drawings, 1 indicates the automobile wheel, including the hub 2, the spokes 3 and the tire 4. 5 is the rim forming part of my invention and which is to be secured to the spokes 3 of the automobile wheel, by means of the curved bolts 6 secured to the rim by means of the nuts 7, said bolts passing through holes 8 in the rim. Said bolts 6 are curved to fit the spokes, as shown in Fig. 4 and in placing the rim on the spokes the bolts 6 are to engage different sides of the spokes so as to firmly secure the rim in place against movement in either direction. Said rim is also provided with openings 9 and grooves 10 in its periphery, said grooves 10 lying adjacent the openings 9, for a purpose to be hereinafter described. 11 is the pulley provided with a flange 12 and with inwardly extending legs 13, said legs extending at an angle beyond the inner edge of the pulley and having their ends bent to lie parallel with the flange 12, as at 14, and said end 14 is provided with a projection 15 adapted to engage the hole 9 in the rim and said end 14 is also provided with an opening 16, through which extends a bolt 17 provided with a tongue 18 which is adapted to engage with the groove 10 in the rim. Said bolt is adapted to be secured in place by means of a nut 19, provided with a handle 20 for rotating the same.

The rim 5 may be allowed to remain on the automobile wheel, as it will not detract from the appearance of the automobile, so that when it is desired to use the automobile as a stationary engine, all that it is necessary to do is to jack up the wheel and place the pulley on the rim by inserting the projections 15 into the holes 9 in the rim and then engaging the tongues 18 of the bolts 17 with the grooves 10 and then tighten the nuts 19 by means of the handles 20. Thus, the pulley is easily and quickly secured to the rim. The belt may then be placed on the pulley and the engine started so as to operate a saw mill or any other desired machine. The flange 12 on the pulley will prevent the belt from coming in contact with the automobile wheel, as the legs 13 are constructed so as to carry the pulley outside of the plane of the wheel.

It is thought from the foregoing that the advantages and novel features of the invention will be readily apparent.

I desire it to be understood that I may make slight changes in the construction and in the combination and arrangement of the several parts, provided that such changes fall within the scope of the appended claim.

I claim as my invention:

An attachment for automobile wheels comprising a rim, means for securing the same to the wheel, said rim having openings therein and grooves in its outer edge adjacent said openings, a pulley having inwardly extending legs, projections thereon adapted to engage with the openings in the rim, and clamping bolts carried by the said legs for engaging with the grooves.

In testimony whereof I affix my signature in presence of two witnesses.

EDWARD A. KOTTKE.

Witnesses:
N. R. KURTH,
J. J. DRAHOS.

Copies of this patent may be obtained for five cents each, by addressing the "Commissioner of Patents, Washington, D. C."